United States Patent
Chen et al.

(10) Patent No.: US 8,806,377 B2
(45) Date of Patent: Aug. 12, 2014

(54) METHOD AND SYSTEM FOR PROVIDING GRAPHICAL USER INTERFACE WITH CONTEXTUAL VIEW

(75) Inventors: Chun-Yi Chen, Belmont, CA (US); Aylin Uysal, Redwood City, CA (US); Sally Baggett, Healdsburg, CA (US); Lulit Bezuayehu, Oakland, CA (US); Prashant Singh, Burlington, MA (US); Aaron Joseph Green, San Francisco, CA (US); Julian Challenger, Reading (GB)

(73) Assignee: Oracle International Corporation, Redwood Shores, CA (US)

(*) Notice: Subject to any disclaimer, the term of this patent is extended or adjusted under 35 U.S.C. 154(b) by 619 days.

(21) Appl. No.: 12/563,075

(22) Filed: Sep. 18, 2009

(65) Prior Publication Data

US 2011/0055768 A1    Mar. 3, 2011

Related U.S. Application Data

(60) Provisional application No. 61/239,036, filed on Sep. 1, 2009, provisional application No. 61/239,038, filed on Sep. 1, 2009.

(51) Int. Cl.
*G06F 3/048* (2013.01)
*G06F 3/0482* (2013.01)
*G06F 3/0481* (2013.01)

(52) U.S. Cl.
CPC ............ *G06F 3/0482* (2013.01); *G06F 3/0481* (2013.01); *G06F 9/446* (2013.01)
USPC ........... 715/841; 715/708; 715/817; 715/854; 715/853

(58) Field of Classification Search
CPC .... G06F 3/0481; G06F 3/0482; G06F 9/4446
USPC .......................... 715/708, 817, 841, 853, 854
See application file for complete search history.

(56) References Cited

U.S. PATENT DOCUMENTS 5,798,769 A    8/1998    Chiu et al.
5,850,221 A    12/1998   Macrae et al.
(Continued)

FOREIGN PATENT DOCUMENTS

| WO | WO 2005/084285 A2 | 9/2005 |
| WO | WO 2007/111951 A2 | 10/2007 |
| WO | WO 2008/042677 A2 | 10/2008 |

OTHER PUBLICATIONS

U.S. Appl. No. 12/490,250, filed Jun. 23, 2009, Chen et al.

(Continued)

*Primary Examiner* — Tadeese Hailu
(74) *Attorney, Agent, or Firm* — Kilpatrick Townsend & Stockton LLP

(57) ABSTRACT

A method and system for providing a graphical user interface with contextual views. In various embodiments, the present invention provides a graphical user interface that allows the changing contents of a global menu in the graphical display based upon the selected nodes that belong to a hierarchical chart. Only those actions applicable (contextual) to the selected nodes will be determined and displayed in the menu. Accordingly, the contents of the selectable options are updated based upon the selected nodes. When more than one node is selected, the displayed selectable actions are an intersection of the actions permitted for each selected node. In a specific embodiment, a comparison menu is provided to allow the user to be able to compare unique corresponding properties of selected nodes.

26 Claims, 9 Drawing Sheets

(56) References Cited

U.S. PATENT DOCUMENTS

| | | | |
|---|---|---|---|
| 5,937,163 A | 8/1999 | Lee et al. | |
| 5,953,724 A | 9/1999 | Lowry | |
| 6,128,617 A | 10/2000 | Lowry | |
| 6,154,750 A | 11/2000 | Roberge et al. | |
| 6,259,451 B1 | 7/2001 | Tesler | |
| 6,496,208 B1 | 12/2002 | Bernhardt et al. | |
| 6,732,114 B1 | 5/2004 | Aamodt et al. | |
| 6,816,175 B1 | 11/2004 | Hamp et al. | |
| 6,859,823 B1 | 2/2005 | Nishihara et al. | |
| 6,944,830 B2 | 9/2005 | Card et al. | |
| 6,990,638 B2 | 1/2006 | Barksdale et al. | |
| 7,080,077 B2 | 7/2006 | Ramamurthy et al. | |
| 7,131,069 B1* | 10/2006 | Rush et al. | 715/738 |
| 7,149,959 B1 | 12/2006 | Jones et al. | |
| 7,152,207 B1 | 12/2006 | Underwood et al. | |
| 7,363,593 B1 | 4/2008 | Loyens et al. | |
| 7,412,647 B2 | 8/2008 | Sellers et al. | |
| 7,574,659 B2* | 8/2009 | Szabo | 715/738 |
| 7,603,632 B1* | 10/2009 | Aamodt et al. | 715/853 |
| 7,743,077 B2 | 6/2010 | Gaurav | |
| 7,802,174 B2 | 9/2010 | Teng et al. | |
| 8,161,413 B2 | 4/2012 | Chen et al. | |
| 8,190,710 B2 | 5/2012 | Chen et al. | |
| 8,205,171 B2 | 6/2012 | Chen et al. | |
| 2003/0218640 A1 | 11/2003 | Noble-Thomas | |
| 2004/0169688 A1* | 9/2004 | Burdick et al. | 345/854 |
| 2004/0205594 A1 | 10/2004 | Arora | |
| 2004/0230917 A1 | 11/2004 | Bales et al. | |
| 2005/0050477 A1 | 3/2005 | Robertson et al. | |
| 2005/0071765 A1 | 3/2005 | Hallisey et al. | |
| 2005/0108260 A1 | 5/2005 | Wenn et al. | |
| 2005/0120005 A1 | 6/2005 | Tesch et al. | |
| 2005/0165766 A1 | 7/2005 | Szabo | |
| 2005/0262192 A1 | 11/2005 | Mamou et al. | |
| 2006/0001647 A1 | 1/2006 | Carroll | |
| 2006/0150169 A1 | 7/2006 | Cook et al. | |
| 2006/0169688 A1 | 8/2006 | Mori et al. | |
| 2006/0195575 A1 | 8/2006 | Delany et al. | |
| 2007/0011316 A1 | 1/2007 | Araki et al. | |
| 2007/0100848 A1 | 5/2007 | Vignet | |
| 2007/0174160 A1 | 7/2007 | Solberg et al. | |
| 2007/0185904 A1 | 8/2007 | Matsuzawa et al. | |
| 2008/0028338 A1 | 1/2008 | Kodosky et al. | |
| 2008/0091441 A1* | 4/2008 | Flammer et al. | 705/1 |
| 2008/0162616 A1 | 7/2008 | Gross | |
| 2009/0070337 A1* | 3/2009 | Romem et al. | 707/10 |
| 2009/0113350 A1* | 4/2009 | Hibino et al. | 715/853 |
| 2009/0144606 A1 | 6/2009 | Vignet | |
| 2009/0164946 A1 | 6/2009 | Liddington | |
| 2010/0287512 A1 | 11/2010 | Gan et al. | |
| 2010/0325198 A1 | 12/2010 | Chen et al. | |
| 2010/0332582 A1 | 12/2010 | Chen et al. | |
| 2011/0055755 A1 | 3/2011 | Chen et al. | |
| 2011/0055756 A1 | 3/2011 | Chen et al. | |
| 2011/0055767 A1 | 3/2011 | Chen et al. | |
| 2011/0055771 A1 | 3/2011 | Chen et al. | |
| 2012/0174040 A1 | 7/2012 | Chen et al. | |

OTHER PUBLICATIONS

"AA OrgChart Webpart." at URL: http://www.aasoftech.com/Products/OrgChartwebpart/Default.asp, downloaded Nov. 20, 2008; Copyright 1997-2007, AASoftech Inc, 1 page.

"Chapter 2: A Tutorial Introduction to Leo," at URL: http://webpages.charter.net.edramleo/intro.html#clones-views, downloaded Nov. 17, 2008, 4 pages.

"Create multiple Views with on one node with paging," Jan. 5, 2008, at URL: http://drupal.org/node/85720, downloaded Nov. 17, 2008, 3 pages.

U.S. Appl. No. 12/492,084, filed Jun. 23, 2009, Chen et al.
U.S. Appl. No. 12/563,069, filed Sep. 18, 2009, Chen et al.
U.S. Appl. No. 12/563,071, filed Sep. 18, 2009, Chen et al.
U.S. Appl. No. 12/563,082, filed Sep. 18, 2009, Chen et al.
U.S. Appl. No. 12/563,085, filed Sep. 18, 2009, Chen et al.

"Different Context Menus depending on selected Node in TreeView-Xtreme Visual Basic Talk," at URL: http://www.xtremevbtalk.com/showthread.php?t=85288, downloaded Nov. 18, 2008, 3 pages.

Dill et al., "A Continuously Variable Zoom for Navigating Large Hierarchical Networks," at URL: http://ieeexplore.ieee.org/Xplore/login.jsp?url=/iel2/3184/9019/00399869.pdf?temp=x, 1994, 5 pages.

"Discussion Forum: Ittoolbox Groups Regarding to organization chart in asp.net" at URL: http://c.ittoolbox.com/groups/technical-functional/csharp-1/regarding-to-organization-chart-in-aspnet-2191857, downloaded Nov. 20, 2008, Copyright 1998-2008, CEB Toolbox, Inc., 2 pages.

"Global View Mode," http://www.ilog.com/documentation/elixir10/en-US/Content/Visualization/Documentation/Elixir/_pubskel/ps_elixir82.html, downloaded Nov. 20, 2008; Copyright 1987-2008, ILOG S.A, 3 pages.

"Google Organizational Charts," Cogmap, at URL: http://www.cogmap.com/chart/google, downloaded Nov. 13, 2008, 5 pages.

"Grouping Data in a Report" at URL: http://msdn.microsoft.com/en-us/library/ms155903(SQL.90).aspx, downloaded Nov. 20, 2008, Copyright 2008, Microsoft Corporation, 2 pages.

"How to Draw Organizational Charts," EDrawsoft, at URL: http://www.edrawsoft.com/How-to-draw-org-charts.php, Copyright 2004-2008, EDrawSoft downloaded Nov. 13, 2008, 2 pages.

"INAPORT Enterprise Data Integration for GoldMine," at URL: http://www.databridgenow.com/what_we_do/inaport.pdf, InaPlex Limited 2002, 6 pages.

"InfoPath Team Blog: recursive Controls support in Infopath," 2003 SP1 at URL: http://blogs.msdn.com/infopath/archive/2004/06/24/164988.aspx;copy, downloaded Dec. 15, 2008, Copyright 2008, Microsoft Corporation, 4 pages.

"Integrated Multi-Views," Journal of Visual Languages & Computing, Abstract, Jun. 1998, vol. 9, Issue 3, at URL: http://www.sciencedirect.com/science?_ob=ArticleURL&_udi=B6WMM-45J5BMS-P&_user=10&rdoc=1&_fmt=&orig=search&_sort=d&view=c&_acct=C000050221&_version=1& urlVersion=0&_userid=10&md5=b16ea573128ea20191cc62fa49df0c46, Copyright 1998, Academic Press, 2 pages.

"JSF portlet with JWL Data Tree Component," at URL: http://www.ibm.com/developerworks/forums/thread.jspa?threadID=161906, downloaded Nov. 18, 2008, 4 pages.

"KNIME Quick Start Guide," at URL: http://www.knime.org/quickstartguide.html, downloaded Nov. 17, 2008; Copyright 2003-2008, University of Konstanz, Germany,10 pages.

"KWizCom Organization Chart web part Installation & User Guide" Copyright 2005, KWizCom Ltd, pp. 1-22.

"McGill Organizational Chart" McGill Organizational Chart Manual-Version Aug. 2, 2005; 11 pages.

Nation et al., "Browse Hierarchical Data with the Degree of Interest Tree," at URL: http://www2.parc.com/istl/groups/uir/publications/items/UIR-2002-12-Nation-CHI2002-DOIDemo.pdf, downloaded 2008, 2 pages.

"Organization Chart," at URL: http://www.aasoftech.com/Demo1/3LevelChart.htm, downloaded Feb. 2, 2011; 1 page.

"Organization charts from Office 2000 programs appear different in Office XP programs," at URL: http://support.microsoft.com/kb/293615, downloaded Nov. 20, 2008; Copyright 2008, Microsoft, 4 pages.

"Organization Chart" http://www.12manage.com/methods_organization_chart.html, downloaded Nov. 20, 2008, Copyright 2008 12manage, 3 pages.

"Organization Chart," at URL: http://www.longbowcg.com/home/services/downloads/coursewarevol2pdf.pdf, downloaded on or before Oct. 2010, 5 pages.

"OrgPlus Professional Tour: 7. Automatically format charts based on the data they contain" at URL: http://www.orgplus.com/products/orgplus-professional/orgplus-professional-tour.htm#, downloaded Nov. 17, 2008, 2000-2008, Copyright HumanConcepts. 1 page.

"OrgPlus Professional Tour: 6. Show chart data in multiple views" at URL:http://www.orgplus.com/products/orgplus-professional/orgplus-professional-tour.htm#, downloaded Nov. 20, 2008, Copyright 2000-2008, HumanConcepts, 1 page.

(56) References Cited

OTHER PUBLICATIONS

OrgPlus Professional Tour 5. Create multiple customized chart views to present employee data differently, at URL:http://www.orgplus.com/products/orgplus-professional/orgplus-professional-tour.htm#, downloaded Nov. 20, 2008, 2000-2008, Copyright HumanConcepts, 2 pages.
"Org Chart Test" at URL: http://sandpit.reitsma.net.au/googleOrg/OrgChartTest.html; downloaded Dec. 15, 2008, 1 page.
Perkins, "Create and organizational chart with HTML, VML, and XML," downloaded Dec. 15, 200, 3 pages.
"1. Portal Tour-Chapter 2. User Guide," at URL: http://www.polarion.com/products/alm/help/ug_quicktour.html, downloaded Nov. 20, 2008; 9 pages.
Plumlee et al.," Zooming, Multiple Windows, and Visual Working Memory," at URL: http://ccom.unh.edu/vislab/PDFs/Zoom_Multi_VisualWMfinal.pdf, 2008; 10 pages.
"Quixa Organisation Chart," at URL: http://www.quixa.com/bpmsuite/orgchart.asp, downloaded Nov. 20, 2008; Copyright 2008, Qiuxa Solutions, 1 page.
"QMF_V8-DB2 QMF Visionary Developer's Guide—Organization chart example," http://publib.boulder.ibm.com/infocenter/dzichelp/v2r2/index.jsp?topic=/com.ibm.qmf.doc.visd.dsqvdmst50.htm, downloaded Nov. 13, 2008, Copyright 1982, 2004, IBM Corporation, 3 pages.
"Readerware views," at URL: http://www.readerware.com/help/rwViews.html, downloaded Nov. 20, 2008; Copyright 1999-2008, Readerware Corporation, 3 pages.
"Sage Abra OrgPlus Professional" Copyright 2007, Sage Software, 2 pages.
"Support Organization Chart" at URL: http://resources2.visual-paradigm.com/index.php/release-vp33/55-vp33/91-org-chart.pdf, Last updated Aug. 11, 2008, 5 pages.
Schaffer et al., at URL: "Navigating Hierarchically Clustered Networks Through Fisheye and Full-Zoom Methods," Fisheye versus Full Zoom Views, Mar. 24, 1998, pp. 1-20.
Stolte et al., "Multiscale Visualization Using Data Cubes," at URL: http://graphics.stanford.edu/papers/pan_zoom/paper.pdf, downloaded 2008, 8 pages.
TreeTable—Java applet combines grid and tree view, at URL: http://www.advancescripts.com/detailed/3201.html, downloaded Nov. 20, 2008; Copyright 2006, AdvanceScripts™, 2 pages.
"TreeView Nodes and ContextMenuStrip" at URL:http://www.devnewsgroups.net/group/microsoft.public.dotnet.framework.windowsforms/topic53850.aspx, downloaded Nov. 18, 2008, 5 pages.
"The Most Trusted Name in Enterprise Organizational Charting and Reporting," OrgPublisher, at URL:http://www.ilog.com/documentation/elixir10/enUS/Content/Visualization/Documentation/Elixir/_pubskel/ps_elixir82.html, downloaded Nov. 20, 2008, 2 pages.
"Understanding Data Graph Window Areas," at URL:http://docs.hp.com/en/B6454-97413/ch08s02.html, downloaded Nov. 18, 2008; Hewlett-Packard Development Company 2000, L.P, 3 pages.
"Welcome to Defura Infotech! Dynamic Org chart and Form Designer Tools," at URL:http://jayankv.com/OrgChartDetails.aspx, downloaded Nov. 13, 2008, Copyright 2007, Defure Infotech, 3 pages.
Zhao et al., "Elastic Hierarchies: Combining Treemaps and Node-Link Diagrams," at URL:http://www.dgp.toronto.edu/~sszhao/paperInforVis05_ElasticHierarchy.pdf, downloaded 2008, 8 pages.
OrgPublisher http://www.orgpublisher.com/docs/pdf/v8/OP8_datasheet.pdf, downloaded on or before Oct. 2010.
U.S. Appl. No. 12/563,069, filed Sep. 18, 2009, Notice of Allowance mailed Dec. 15, 2011, 9 pages.
U.S. Appl. No. 12/563,071, filed Sep. 18, 2009, Notice of Allowance mailed Mar. 8, 2012, 8 pages.
U.S. Appl. No. 12/563,082, filed Sep. 18, 2009, Office Action mailed Jan. 25, 2012, 12 pages.
U.S. Appl. No. 12/563,085, filed Sep. 18, 2009, Office Action mailed Jan. 26, 2012, 12 pages.
U.S. Appl. No. 12/490,250, filed Jun. 23, 2009, Notice of Allowance mailed Feb. 3, 2012, 8 pages.
U.S. Appl. No. 12/490,250, filed Jun. 23, 2009, Office Action mailed Sep. 28, 2011, 4 pages.
U.S. Appl. No. 12/490,250, filed Jun. 23, 2009, Office Action mailed Apr. 1, 2011, 8 pages.
U.S. Appl. No. 12/492,084, filed Jun. 25, 2009, Office Action mailed Feb. 13, 2012, 10 pages.
U.S. Appl. No. 12/563,082, filed Sep. 18, 2009, Final Office Action mailed May 29, 2012, 13 pages.
U.S. Appl. No. 12/563,082, filed Sep. 18, 2009, Advisory Action mailed Aug. 17, 2012, 3 pages.
U.S. Appl. No. 12/563,085, filed Sep. 18, 2009, Advisory Action mailed Aug. 17, 2012, 5 pages.
U.S. Appl. No. 12/563,085, filed Sep. 18, 2009, Final Office Action mailed May 29, 2012, 13 pages.
U.S. Appl. No. 13/459,447, filed Apr. 30, 2012, Non-Final Office Action mailed Jun. 22, 2012, 9 pages.
U.S. Appl. No. 13/459,447, filed Apr. 30, 2012,Terminal Disclaimer—Approved mailed Sep. 28, 2012, 1 pages.
U.S. Appl. No. 13/459,447, filed Apr. 30, 2012, Notice of Allowance mailed Oct. 16, 2012, 29 pages.
U.S. Appl. No. 12/492,084, filed Jun. 25, 2009, Notice of Allowance mailed Aug. 2, 2012, 5 pages.

\* cited by examiner

METHOD AND SYSTEM FOR PROVIDING GRAPHICAL USER INTERFACE WITH CONTEXTUAL VIEW

CROSS-REFERENCES TO RELATED APPLICATIONS

The present application claims the benefit and priority under 35 U.S.C. 119(e) from the following U.S. Provisional Applications, the entire contents of which are herein incorporated by reference for all purposes:

(1) U.S. Provisional Application No. 61/239,036, filed Sep. 1, 2009, entitled METHOD AND SYSTEM FOR PROVIDING GRAPHICAL USER INTERFACE WITH CONTEXTUAL VIEW;

(2) U.S. Provisional Application No. 61/239,038, filed Sep. 1, 2009, entitled METHOD AND SYSTEM FOR DISPLAYING GROUP RELATIONSHIPS IN A GRAPHICAL USER INTERFACE;

The present application also incorporates by reference for all purposes the entire contents of U.S. application Ser. No. 12/563,082 filed Sep. 18, 2009, entitled METHOD AND SYSTEM FOR DISPLAYING GROUP RELATIONSHIPS IN A GRAPHICAL USER INTERFACE.

BACKGROUND OF THE INVENTION

The present invention is directed to a method and system for providing a user interface representing organization hierarchy that offers a contextual view.

In an information age, more and more data is being collected and stored every second. Satellites orbiting the earth record information and photograph our planet everyday, and they send this information and photographs back to earth. Millions of computers on the Internet collect all types of information, ranging from network usage to marketing data. All types of organizations, large and small, store information such as personnel data, operational costs, etc. New tools are invented to make collecting data easier, faster, and more convenient than ever before.

Data, no matter how it is collected, is only meaningful and useful when organized and stored logically. For example, computers often rely on data structure to store data in predefined fields. For large amounts of data, people usually rely on databases, where structured collections of data and/or records are stored in computer systems in accordance to predefined rules and/or database models.

Relationship models, hierarchical models, and network models, are commonly used database models for representing relationships among records. Typically, databases rely on database software to organize and manage the data and/or records. For example, database software organizes and stores data and/or records using various types of database models.

Graphical user interface ("GUI") is a helpful tool for displaying data and showing the relationships thereof. Numerous conventional graphical interfaces are capable of displaying records from a database in a hierarchical view. For example, Oracle Corporation offers many software tools for displaying organization charts in a hierarchical view, the organization chart being a representation of data selected from a database.

While a GUI is useful in displaying information, it is often not enough. It is often useful and convenient if a user is able to interact with the information. In the past, various conventional techniques have been developed to allow users to interface with records displayed in a hierarchical chart.

Therefore, a new and improved graphical user interface is desired.

BRIEF SUMMARY OF THE INVENTION

The present invention is directed to a method and system for providing a user interface representing an organizational hierarchy that offers a contextual view. In various embodiments, the present invention provides a graphical user interface displaying related records in a hierarchical view, in which a user is able select actions that are uniquely associated with selected records. More specifically, the types of actions available for user selection in a menu are displayed based on the actions that are specific to the selected records. In an embodiment, when more than one record is selected, a common set of actions are permitted for all the selected records that are being displayed. There are other features as well, in the graphical interface.

In various embodiments, the present invention provides a graphical user interface that allows changing the contents of a global menu in the graphical display based upon the selected nodes. Only those actions applicable (contextual) to the selected nodes will be determined and displayed in the menu. Accordingly, the contents of the selectable options are updated based upon the selected nodes. When more than one node is selected, the displayed selectable actions are an intersection of the actions permitted for each selected node.

According to an embodiment, the present invention provides a method for operating the graphical user interface. In a computer system having a processor, a graphical user interface including a display and a user interface selection device communicatively coupled to the processor, a method for operating the graphical user interface is provided. The method includes obtaining a plurality of records from a database, relationship data associated with the plurality of records being stored in the database, each of the plurality of records including unique action types, the plurality of records including a first record and a second record, the first record including a first plurality of predefined actions, the second record including a second plurality of predefined actions. The method also includes defining a menu region and a display region within the graphical user interface, the menu region including a first menu. The method further includes displaying the plurality of records within the display region, the plurality of records being displayed as a hierarchical chart based on at least the relationship data. Additionally, the method includes receiving, by the user interface selection device, a user selection of one or more records displayed within the display region. The method additionally includes processing the user selection. Furthermore, the method includes determining a first set of menu actions based on the user selection. The method also includes updating the first menu to include the first set of the menu actions. The first set of menu actions consists of the first plurality of predefined actions if the user selection indicates that the first record is selected. The first set of menu actions consists of the second plurality of predefined actions if the user selection indicates that the second record is selected. The first set of menu actions consists of the predefined actions that are common to both the first record and the second record if the user selection indicates that both the first record and the second record are selected.

According to another embodiment, the present invention provides graphical user interface. In a computer system having a processor, a graphical user interface including a display and a user interface selection device communicatively coupled to the processor is provided. The graphical user interface includes a display region within the graphical user interface, the display region being adapted to display a plurality of records in a hierarchical chart, the plurality of records being stored in a database, relationship data associated with the plurality of records being stored in the database, each of the plurality of records including unique action types, the plurality of records including a first record and a second record, the first record including a first plurality of predefined actions, the second record including a second plurality of predefined actions. The graphical interface also includes a menu region display within the display, the menu region including a first menu, the first menu including a first plurality of actions items, the plurality of actions items being common to each of the plurality of records. Upon receiving a user selection of one or more records using the user interface selection device, the processor processes the user selection. The first menu is updated to include a second plurality of action items, the second plurality of action items includes the first plurality of actions if the user selection indicates that the first record is selected. The first menu is updated to include a second plurality of action items, the second plurality of action items includes the second plurality of predefined actions if the user selection indicates that the second record is selected. The first menu is updated to include a second plurality of action items, the second plurality of action items includes the predefined actions that are common to both the first record and the second record if the user selection indicates that both the first record and the second record are selected.

According to yet another embodiment, the present invention provides a computer system for providing an interactive graphical user interface. The system includes a graphical user interface including a display, the display including a menu region and a display region within the graphical user interface, the menu region including a first menu, display region being adapted to display a plurality of records as in a hierarchical chart based on at least relationship data obtained from a database, the relationship data associated with the plurality of records being stored in the database, each of the plurality of records including unique action types, the plurality of records including a first record and a second record, the first record including a first plurality of predefined actions, the second record including a second plurality of predefined actions. The system also includes a memory. The system further includes an input module for receiving user input, the input module being configured to receive a user selection of one or more records displayed within the display region. The system also includes a processor, the processor being configured to obtain records from the database and process the user input to determine a first set of menu actions based on the user selection. The first set of menu actions consists of the first plurality of predefined actions if the user selection indicates that the first record is selected. The first set of menu actions consists of the second plurality of predefined actions if the user selection indicates that the second record is selected. The first set of menu actions consists of the predefined actions that are common to both the first record and the second record if the user selection indicates that both the first record and the second record are selected.

It is to be appreciated that the embodiments of the present invention provides many benefits. In an embodiment, users are afforded a GUI that allow users to interact with displayed information in meaningful ways. In contrast to conventional menus where available actions associated with information nodes are displayed based on presets of GUI, a GUI according to the present invention provides actions that are unique to the information selected, thereby allowing the user to directly interact with the data that is specifically useful. Furthermore, various embodiments of the present invention are compatible with conventional systems. For example, a conventional computer system is able to practice certain embodiments of the present invention by means of software installation and/or updates. There are many other benefits as well.

DETAILED DESCRIPTION OF THE INVENTION

Embodiments of the present invention are related to a method and system for providing a user interface representing an organizational hierarchy that offers a contextual view. In various embodiments, the present invention provides a graphical user interface displaying related records in a hierarchical view, in which a user is able select actions that are uniquely associated with selected records. More specifically, the types of actions available for user selection in a menu are displayed based on the actions that are specific to the selected records. In an embodiment, when more than one record is selected, a common set of actions that are permitted for all the selected records is displayed. There are other features as well in the graphical interface.

As explained above, conventional graphical user interfaces are inadequate for many applications. More specifically, conventional GUIs cannot help users to directly interact with the displayed data. For instance, in a hierarchical chart there is a node that contains a telephone number that is associated with that particular node. In various embodiments of the present invention, a user is able to select a node and is then able to select from a context sensitive menu to dial a telephone number. In conventional GUIs, such features are simply not available.

Figure 1:
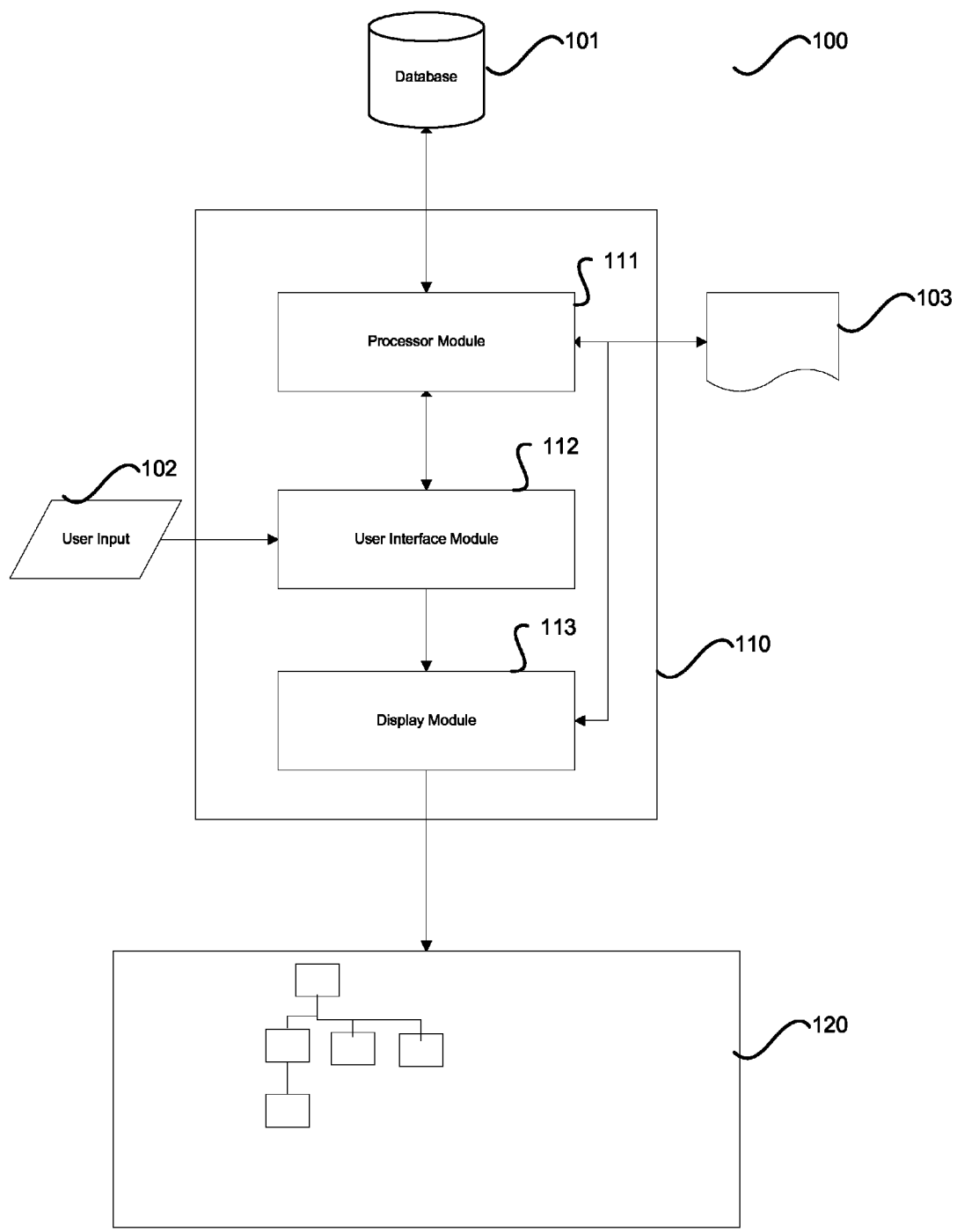
FIG. 1 is a simplified diagram illustrating a conventional graphical user interface.

FIG. 1 is a simplified diagram illustrating data flow for processes according to embodiments of the present invention. This diagram is merely an example, which should not unduly limit the scope of the claims. One of ordinary skill in the art would recognize many variations, alternatives, and modifications.

As shown in FIG. 1, a system 100 may be comprised of the following components:

1. a database 101;
2. a processor module 111;
3. a user interface module 112;
4. a rendering module 113; and
5. a display 120.

As an example, the processor module 111, the user interface module 112, and the rendering module 113 are parts of a controller module 110.

The database 101 is connected to the controller module 110. Depending on the application, the database 101 may implemented as structured data stored on a local memory device, such as hard disk, flash memory, etc. In one embodiment, the database 101 is stored at a network location.

Among other features, the database 101 stores data that represents various entities that are related to one another. The database 101 stores relationship data representing the relationship among these entities. Each of these entities is associated with one or more actions. For example, an entity in the database 101 represents a manager in a personnel database, and the manager has attributes that include name, address, salary, title, etc. The name display is associated with view 1, address display is associated with view 2, and so on. Each of these people stored in the database is associated with a specific set of actions. For example, the manager is associated with actions such as hiring and firing employees. The same actions of the manager are not available to other people represented on the hierarchical chart.

The processor module 111 is configured to obtain information from the database 101. For example, the processor module 111 retrieves both entities data and relationship data mentioned above and processes this data. In various embodiments, the processor module 111 determines category and/or view information for each of the entities in the database and stores the view information using the status indicator 103. In one embodiment, the status indicator 103 stores (1) what actions are available for each entity; and (2) what actions are to be performed when an action for an entity is selected.

Once the processor module 111 processes the information from the database 101, the processor module 111 generates a hierarchical chart that is to be displayed on the display 120. As shown in FIG. 1, processor module 111 sends the hierarchical chart to the rendering module 113 for rendering on the display 120. As shown in FIG. 1, the display 120 is used to display the hierarchical chart. For example, the hierarchical chart includes a number of nodes and links. Each of the nodes represents an entity and/or concept that is stored in the database. The links among the nodes represent the relationship among the nodes. When the hierarchical chart is displayed, the action that is to be displayed for each node is available action stored in the status indicator 103.

The controller module 110 as shown includes a user interface module 112 for receiving user input. When a user's input 102 is received, the display 120 updates accordingly. For example, when user input 102 indicates that the view should be changed, the user input is received by the user interface module 112 and processed by the processor module 111. The processor module 111 updates the actions in the status indicator 103, and retrieves additional information from the database if necessary. For example, the processor module 111 also performs actions selected by users. The processor module 111 then generates an updated hierarchical chart, in which one or more nodes show action available for that particular node. The updated hierarchical chart is then rendered by the rendering module 113 and then displayed on the display 120.

Depending on the operational mode, the actions for the nodes may work in different ways. In one exemplary scenario, the information for each node on the hierarchical chart is processed to show the specific actions available to the node. Depending on the application, action may be used to perform a variety of functions, such as updating the hierarchical chart, initializing a new action, dialing a telephone number, etc. The detailed operation of displaying and updating a hierarchical chart is described in more detail below.

Figure 2:
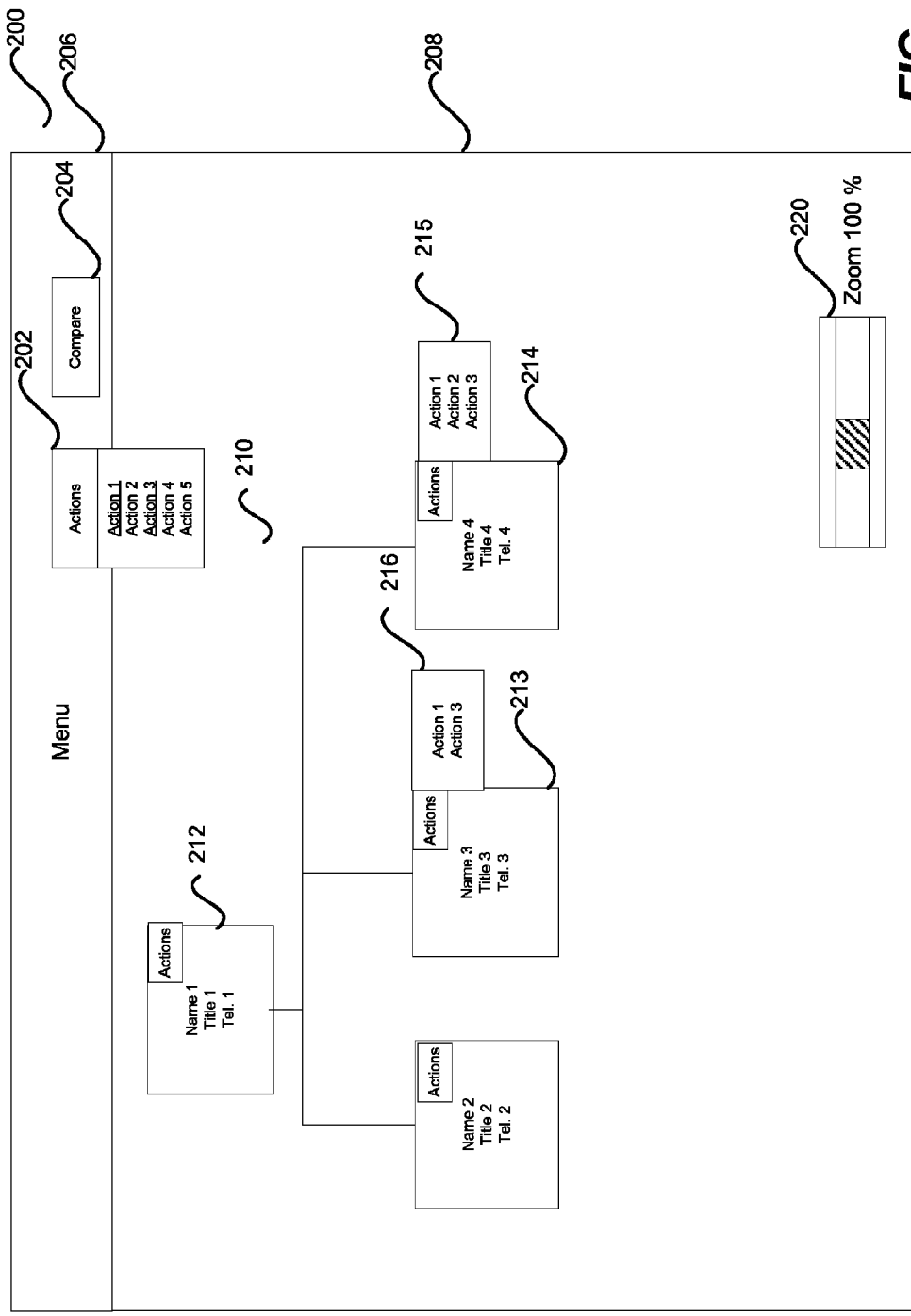
FIG. 2 is a simplified diagram illustrating a graphical user interface containing a contextual menu according to an embodiment of the present invention.

FIG. 2 is a simplified diagram illustrating a graphical user interface containing a contextual menu according to an embodiment of the present invention. This diagram is merely an example, which should not unduly limit the scope of the claims. One of ordinary skill in the art would recognize many variations, alternatives, and modifications.

As shown in FIG. 2, a graphical user interface 200 includes a menu region 206 and a display region 208. The menu region 206 contains various control functions (not shown in FIG. 2) such as opening a file, copying and pasting, etc, depending on the specific applications involved. As shown in FIG. 2, the menu region 206 includes actions menu 202 and comparison menu 204.

The display region 208 displays a hierarchical chart 210 as shown. The display region 208 is used for displaying hierarchical charts only. The hierarchical chart 210 as shown includes a plurality of nodes. For example, each of the nodes corresponds to a record stored in a database system. The hierarchical display of the records is based on the relationships among these records as indicated by the database. The nodes of the hierarchical chart 210, as shown, display names (e.g., Name 1, Name 2, etc.), but it is to be understood that other information items may be displayed as well. In a specific embodiment, the display region 208 has a default setting for displaying information in a node. For example, at the default setting, name and/or other information associated with each node is displayed.

In addition to the node's specific information, the nodes as shown may contain action menus and/or links. In a specific embodiment, each node displayed in the GUI has a context sensitivity menu showing the actions that are associated with the nodes. For example, the association between the actions and the nodes are predefined and stored in the database. In an embodiment, actions that are available for a record are stored as a part of the record data structure in the database. In an embodiment, a processor determines what actions are available to a node based on the data stored in the database. Merely by way of an example, after the processor retrieves a personal or specific record that contains a telephone number, the processor can generate an action of dialing that telephone number associated with the specific record.

As shown in FIG. 2, an action menu 216 is displayed next to the node 213, indicating that Action 1 and Action 3 are available to the node 213. Similarly, an action menu 215 is displayed next to the node 214, indicating that Action 1, Action 2, and Action 3 are available to the node 213. It is to be appreciated that the different nodes can have different available actions, which is different from the conventional action menu displays. It is also to be appreciated that the action menus 215 and 216 are for illustration purpose only. In a specific embodiment, only one set of actions for a particular node can be shown in the display region 208 at a given time.

In addition to the action menus (e.g., menu 215) that are available to the nodes, the menu region 206 also includes the specific action menu 202 for displaying actions that can be performed. In an embodiment, the action menu 202 is a global menu that is used to display available action based on a status of node selection. More specifically, when a node is selected, the action menu 202 displays only actions that are available to that node. For example, if the node 214 is selected, the action menu 202 displays Action 1, Action 2 and Action 3. Similarly, if the node 213 is selected, the action menu 202 displays Action 1 and Action 3. When two or more nodes are selected, the action menu 202 displays actions that are common to both nodes. For example, if the nodes 213 and 214 are both selected, the action menu 202 displays Action 1 and Action 3, since Action 1 and Action 3 are common to both nodes 213 and 214.

In a specific embodiment, the action menu 202 displays actions common to all of the nodes displayed in the display region 208, when none of the nodes are selected. In another embodiment, the action menu does not display any actions when none of the nodes are selected.

As shown in FIG. 2, the menu region 206 also includes the comparison menu 204. For example, the comparison menu 204 is also a contextual menu whose content is based on the nodes that are selected. In a specific embodiment, the comparison menu 204 provides a list of menu items for comparing information categories that are common to the selected nodes.

Figure 3:
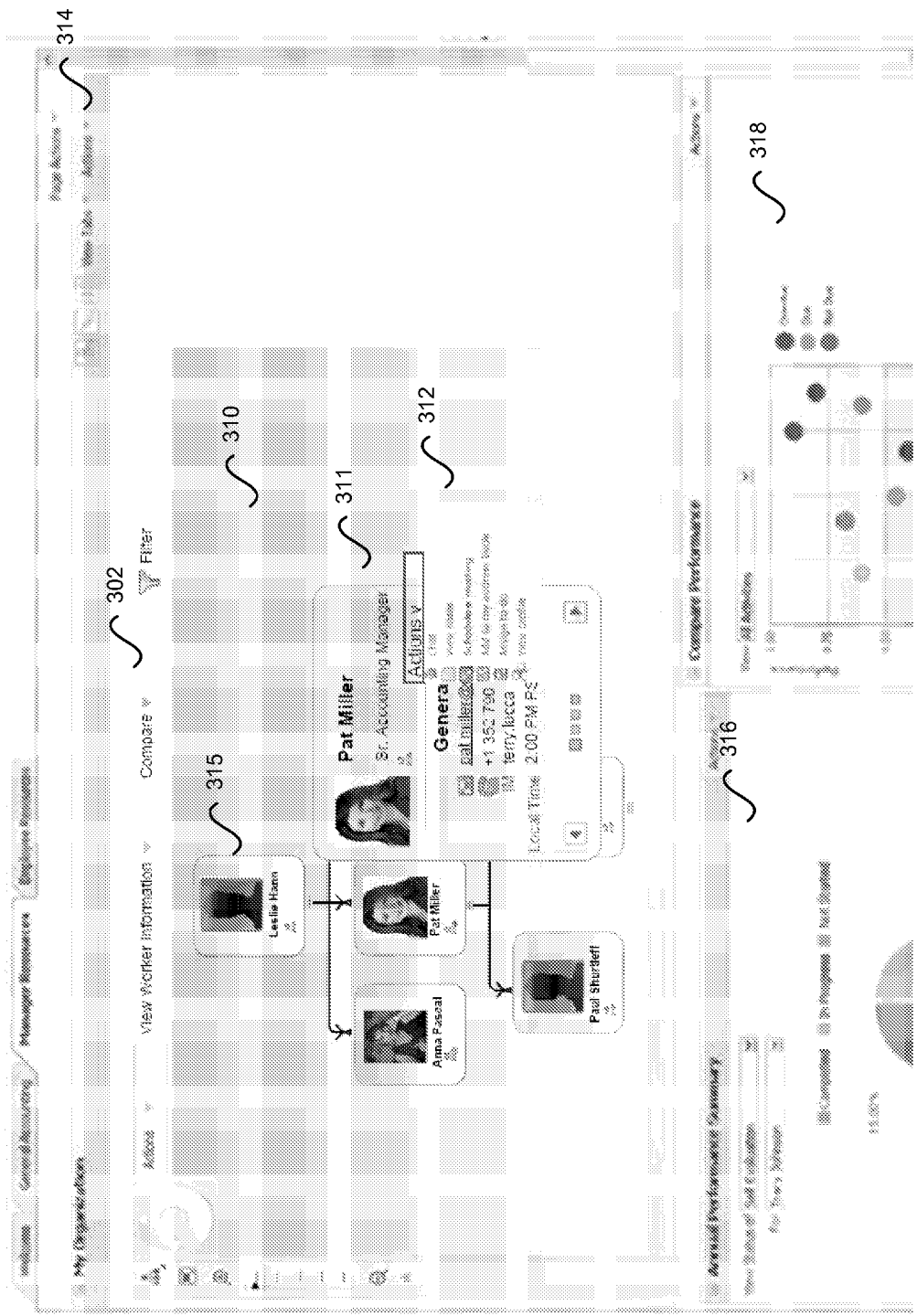
FIG. 3 is screen shot illustrating an exemplary graphical user interface according to an embodiment of the present invention.

FIG. 3 is screen shot illustrating an exemplary graphical user interface according to an embodiment of the present invention. This diagram is merely an example, which should not unduly limit the scope of the claims. One of ordinary skill in the art would recognize many variations, alternatives, and modifications.

As shown in FIG. 3, a graphical user interface includes a global menu action 314 and a comparison menu 302. A hierarchical chart 310 is displayed. The hierarchical chart 310 includes various nodes. As an example, node 311 is selected. In a specific embodiment, the selected node is enlarged to display additional information. Node 311, for example, is enlarged when selected to display more information than the unselected nodes. The enlarged display of node 311 displays, in addition to information that is specific to node 311, the action menu 312. For example, action menu 312 displays action items that include "chat," "view notes," "schedule meeting," "add to my address book," "assign to do," and view "profile." It is to be noted that these action items are context sensitive specific to node 311. For example, node 311 as shown includes contact information. As merely an example, assume that node 315 does not contain any contact information, the "add to my address book" would not be an available action for node 315. In addition to being context sensitive, action item availability can also depend on other factors, such as user privilege. For example, node 311 contains information associated with a senior manager, and only a user with a high level of privilege can have access to one or more of the actions displayed in action menu 312.

Action menu 312 is not the only action menu that can be used. As described above and illustrated in FIG. 2, according to embodiments of the present invention, the GUI also has a global action menu. In FIG. 3, global action menu 314 is shown in the menu tool bar of the GUI. Action menu 314 includes the action items that are specific to selected node(s). For example, when node 311 is selected, the action items shown in menu 312 are available in the global action menu 314 as well.

According to various embodiments, the action menus shown in the GUI can be linked to other programs. For example, by selecting the "chat" action in action menu 312, the user initiates an instant messaging program that connects to the person displayed in node 311. Similarly, when the "assign to do" action is selected, a scheduling program (e.g., Microsoft Outlook™) is opened and a new "to do" item is opened. It is to be appreciated that the actions are not limited to the software programs. In a specific embodiment, the GUI can be used to access hardware modules that are external to the computer system. For example, the action menu may contain action items such as "call the person," which would, when selected, initiate a telephone call on an external communication device.

In a specific embodiment, the GUI contains regions for performing selected actions. For example, windows 316 and 318, as a part of the GUI shown in FIG. 3, display information based on the action selected.

As explained above, the context sensitive menus according to embodiments of the present invention are not limited to the actions specifically available to selected nodes. As shown in FIG. 3, the GUI also includes a comparison menu 302, which is context sensitive based on the nodes selected. In a specific embodiment, the comparison menu 302 is only active and/or available when two or more nodes have been selected.

Figure 4:
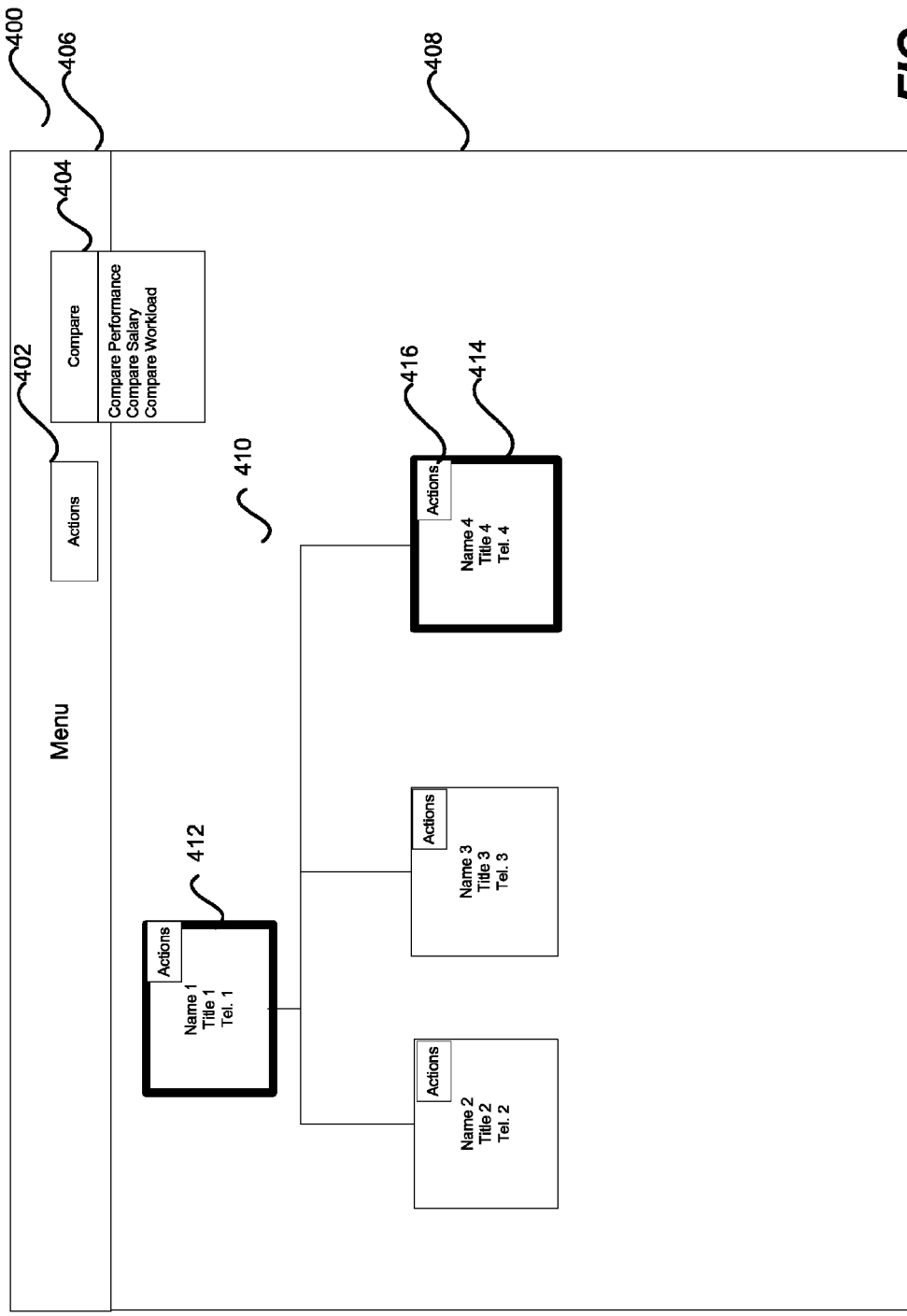
FIG. 4 is a simplified diagram for illustrating a user interface that provides a context sensitive comparison menu according embodiments of the present invention.

FIG. 4 is a simplified diagram for illustrating a user interface that provides context sensitive comparison menu according embodiments of the present invention. This diagram is merely an example, which should not unduly limit the scope of the claims. One of ordinary skill in the art would recognize many variations, alternatives, and modifications.

As shown in FIG. 4, a graphical user interface 400 includes a menu region 406 and a display region 408. As an example, menu region 406 contains various control functions (not shown in FIG. 4) such as opening a file, copying and pasting, etc, depending on the specific applications involved. As shown in FIG. 4, menu region 406 as shown includes an action menu 402 and comparison menu 404.

Display region 408 displays a hierarchical chart 410 as shown. Display region 408 is used for displaying hierarchical charts only. Hierarchical chart 410 as shown includes a plurality of nodes. For example, each of the nodes corresponds to a record stored in a database system. The hierarchical display of the records is based on the relationships among these records as indicated by database. The nodes of hierarchical chart 410 as shown displays names (e.g., Name 1, Name 2, etc.), but it is to be understood that other information items may be displayed as well. In a specific embodiment, display 400 has a default setting for displaying information in a node. For example, at the default setting, name and/or other information associated with each node are displayed.

According to various embodiments, the nodes shown in FIG. 4 are records stored in a database according to a data structure. For example, each record has a predetermined set of information fields. The comparison menu 404 displays selectable menu items for comparing the information of corresponding information fields of selected records. As shown in FIG. 4, nodes 412 and 414 are selected. For example, both nodes 412 and 414 contain performance, salary, and workload information. As a result of the user selecting nodes 412 and 414, the performance, salary, and workload information for the two nodes can be compared. In the computer system, a processor determines (1) which nodes are selected; (2) what information field is available for comparison in each of the selected nodes; and (3) which information fields are common to both nodes for comparison.

Figure 5:
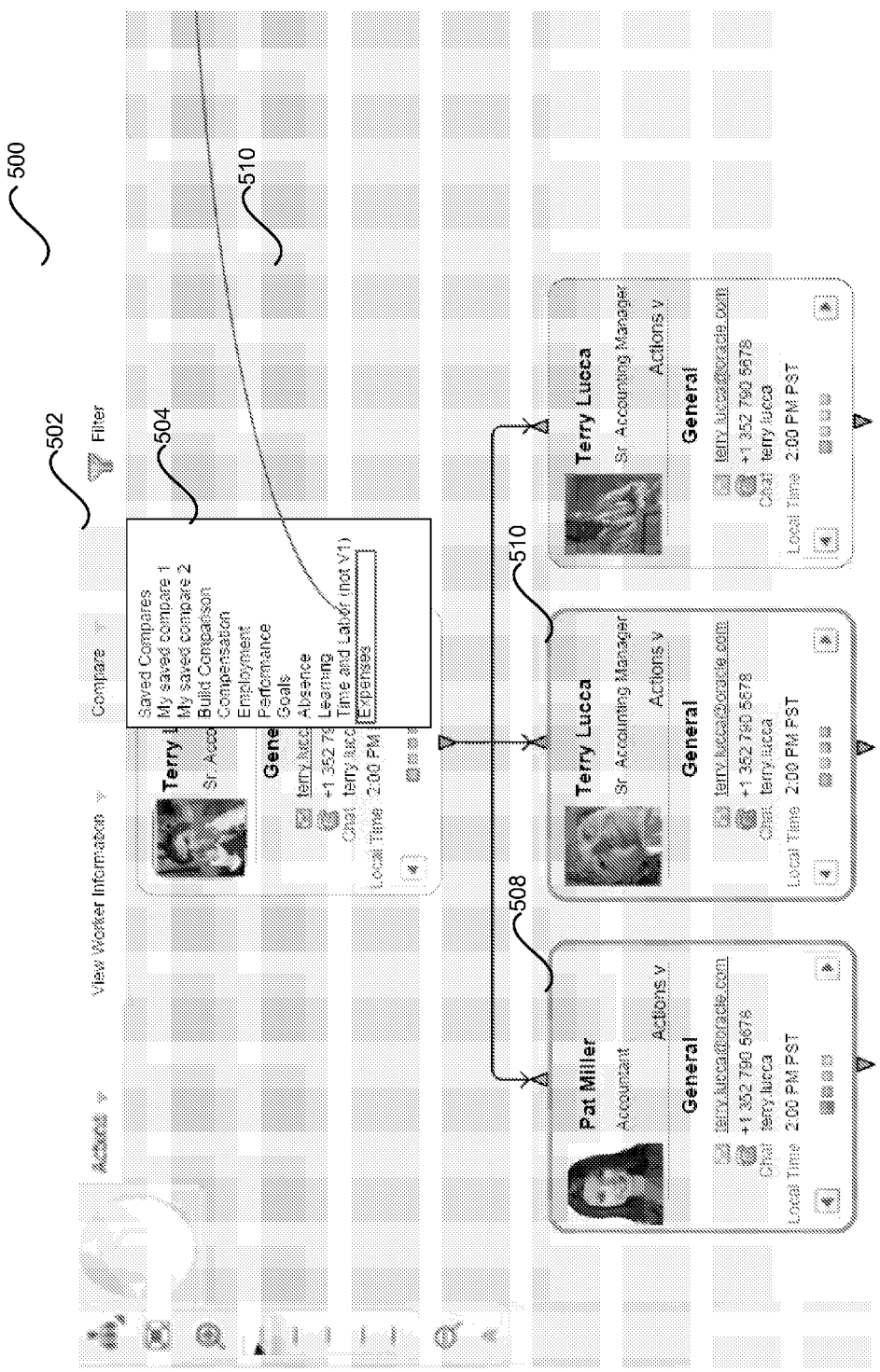
FIG. 5 is an exemplary screen shot for illustrating a user interface that provides a context sensitive comparison menu according embodiments of the present invention.

FIG. 5 is an exemplary screen shot for illustrating a user interface that provides context sensitivity to the comparison menu according to embodiments of the present invention. This diagram is merely an example, which should not unduly limit the scope of the claims. One of ordinary skill in the art would recognize many variations, alternatives, and modifications.

As shown in FIG. 5, a graphical user interface 500 includes, among other things, a comparison menu 502. A hierarchical chart 510 is displayed. Hierarchical chart 510 includes various nodes. As an example, nodes 508 and 510 are selected. Comparison menu 502 displays information of nodes 508 and 510 that can be compared. As shown, the information for comparison includes "compensation," "employment," "performance," etc. It is to be understood that depending on the data of the nodes, there can be other types of information for comparison.

In various embodiments, comparison menu 502 offers additional menu options than just comparing information. For example, a user is able to save a comparison of two nodes. In addition, comparison menu 502 may also offer other menu options that generate a new window for displaying comparison result, etc.

Figure 6:
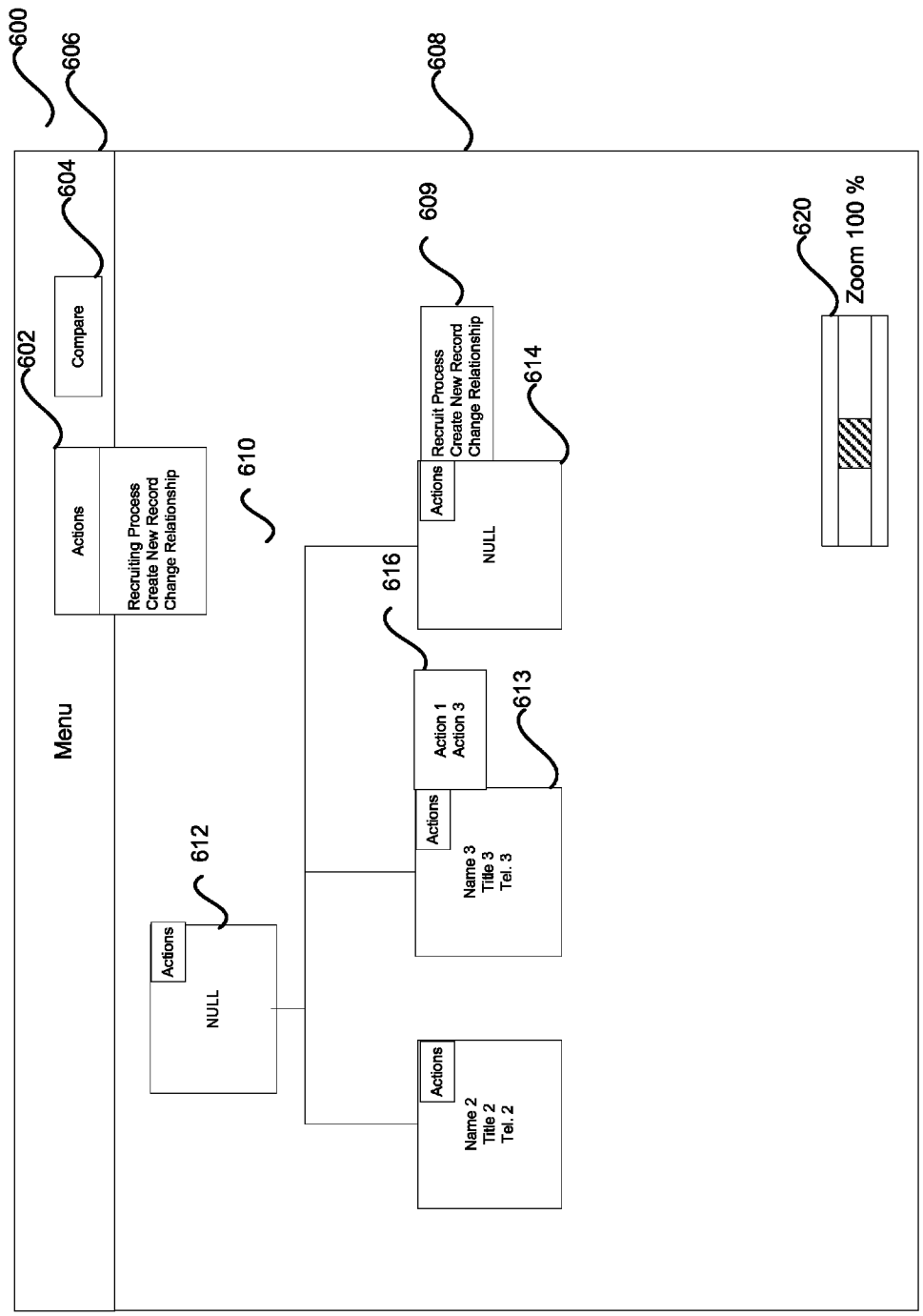
FIG. 6 is a simplified diagram illustrating a graphical user interface that provides a context menu according to an embodiment of the present invention.

In an embodiment, the present invention provides a unique set of action items for certain types of nodes. FIG. 6 is a simplified diagram illustrating a graphical user interface that provides a context menu according to an embodiment of the present invention. This diagram is merely an example, which should not unduly limit the scope of the claims. One of ordinary skill in the art would recognize many variations, alternatives, and modifications.

As shown in FIG. 6, a graphical user interface 600 includes a menu region 606 and a display region 608. The menu region 606 contains various control functions (not shown in FIG. 6) such as opening a file, copying and pasting, etc, depending on the specific applications involved. Menu region 606 as shown includes action menu 602 and comparison menu 604.

Display region 608 displays a hierarchical chart 610 as shown. The display region 608 is used for displaying hierarchical charts only. Hierarchical chart 610 as shown includes a plurality of nodes. For example, each of the nodes corresponds to a record stored in a database system. The hierarchical display of the records is based on the relationships among these records as indicated by the database. The nodes of hierarchical chart 610 as shown display names (e.g., Name 1, Name 2, etc.), but it is to be understood that other information items may be displayed as well.

Hierarchical chart 610 includes node 614 that is a NULL node. For example, the NULL node 614 indicates that there are no records or data in the database associated with node 614. The available actions that can be performed with NULL node 614 thus includes "Recruit Process," "Create New Record," and "Change Relationship," each of which has to do with creating a new node and/or filling up a NULL node. In a specific embodiment, the available actions in a NULL node depend on the position of that node within the hierarchical chart. For example, the "Recruit Process" action may be available to NULL node 614, but not to NULL node 612, as node 612 and node 614 are at different level of the hierarchy.

Figure 7:
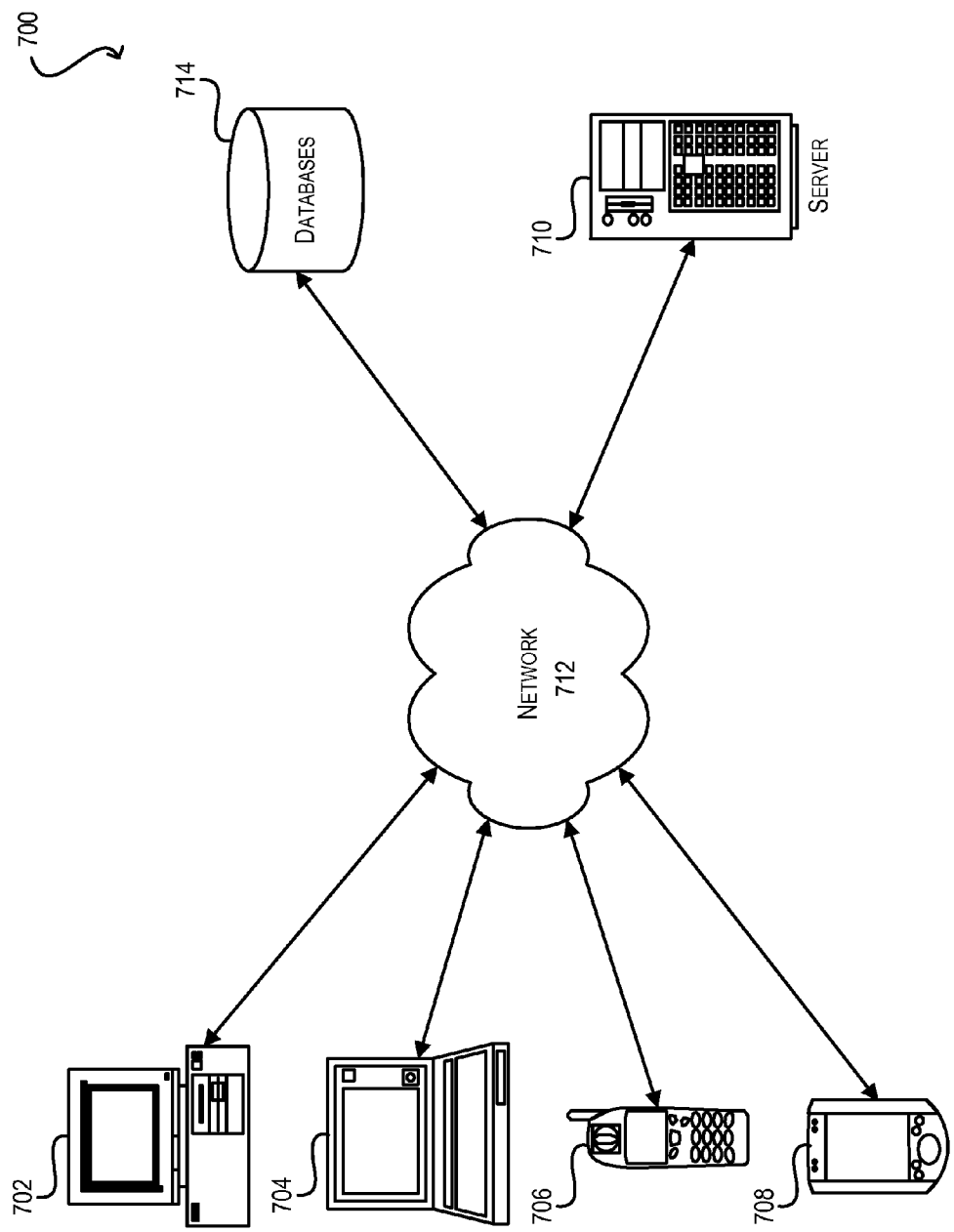
FIG. 7 is a simplified block diagram illustrating a physical system environment that may be used in accordance with an embodiment of the present invention.

It is to be appreciated that the graphical user interface can be implemented with various types of hardware systems. FIG. 7 is a simplified block diagram illustrating physical components of system environment 700 that may be used in accordance with an embodiment of the present invention. This diagram is merely an example, which should not unduly limit the scope of the claims. One of ordinary skill in the art would recognize many variations, alternatives, and modifications.

As shown, system environment 700 includes one or more client computing devices 702, 704, 706, 708 communicatively coupled with a server computer 710 via a network 712. In one set of embodiments, client computing devices 702, 704, 706, 708 may be configured to run one or more components of a graphical interface described above.

Client computing devices 702, 704, 706, 708 may be general purpose personal computers (including, for example, personal computers and/or laptop computers running various versions of Microsoft Windows™ and/or Apple Macintosh™ operating systems), cell phones or PDAs (running software such as Microsoft Windows Mobile™ and being Internet, e-mail, SMS, Blackberry™, and/or other communication protocol enabled), and/or workstation computers running any of a variety of commercially-available UNIX™ or UNIX™-like operating systems (including without limitation the variety of GNU/Linux™ operating systems). Alternatively, client computing devices 702, 704, 706, and 708 may be any other electronic devices capable of communicating over a network (e.g., network 712 described below) with server computer 710. Although system environment 700 is shown with four client computing devices and one server computer, any number of client computing devices and server computers may be supported.

Server computer 710 may be a general purpose computer, specialized server computer (including, e.g., a LINUX™ server, UNIX™ server, mid-range server, mainframe computer, rack-mounted server, etc.), server farm, server cluster, or any other appropriate arrangement and/or combination. Server computer 710 may run an operating system including any of those discussed above, as well as any commercially available server operating system. Server computer 710 may also run any variety of server applications and/or mid-tier applications, including web servers, Java virtual machines, application servers, database servers, and the like. In various embodiments, server computer 710 is adapted to run one or more Web services or software applications described in the foregoing disclosure. For example, server computer 710 may provide the abovementioned graphical user interface and functionalities thereof.

As shown, client computing devices 702, 704, 706, 708 and server computer 710 are communicatively coupled via network 712. Network 712 may be any type of network that can support data communications using any variety of commercially-available protocols, including without limitation TCP/IP, SNA, IPX, AppleTalk™, and the like. Merely by way of example, network 712 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infrared network; a wireless network (e.g., a network operating under any of the IEEE 802.11 suite of protocols, the Bluetooth™ protocol known in the art, and/or any other wireless protocols); and/or any combination of these and/or other networks. In various embodiments, the client computing devices 702, 704, 706, 708 and server computer 710 are able to access the database 714 through the network 712. In certain embodiments, the client computing devices 702, 704, 706, 708 and server computer 710 each has its own database.

System environment 700 may also include one or more databases 714. Database 714 may correspond to an instance of integration repository as well as any other type of database or data storage component described in this disclosure. Database 714 may reside in a variety of locations. By way of example, database 714 may reside on a storage medium local to (and/or residing in) one or more of the client computing devices 702, 704, 706, 708, or server computer 710. Alternatively, database 714 may be remote from any or all of the client computing devices 702, 704, 706, 708, or server computer 710 and/or in communication (e.g., via network 712) with one or more of these. In one set of embodiments, database 714 may reside in a storage-area network (SAN) familiar to those skilled in the art. Similarly, any necessary files for performing the functions attributed to the client computing devices 702, 704, 706, 708, or server computer 710 may be stored locally on the respective computer and/or remotely on database 714, as appropriate. In one set of embodiments, database 714 is a relational database, such as Oracle 10g™ available from Oracle Corporation that is adapted to store, update, and retrieve data in response to SQL-formatted commands. In various embodiments, database 714 stores data that is displayed as hierarchical charts shown in FIGS. 2-5.

Figure 8:
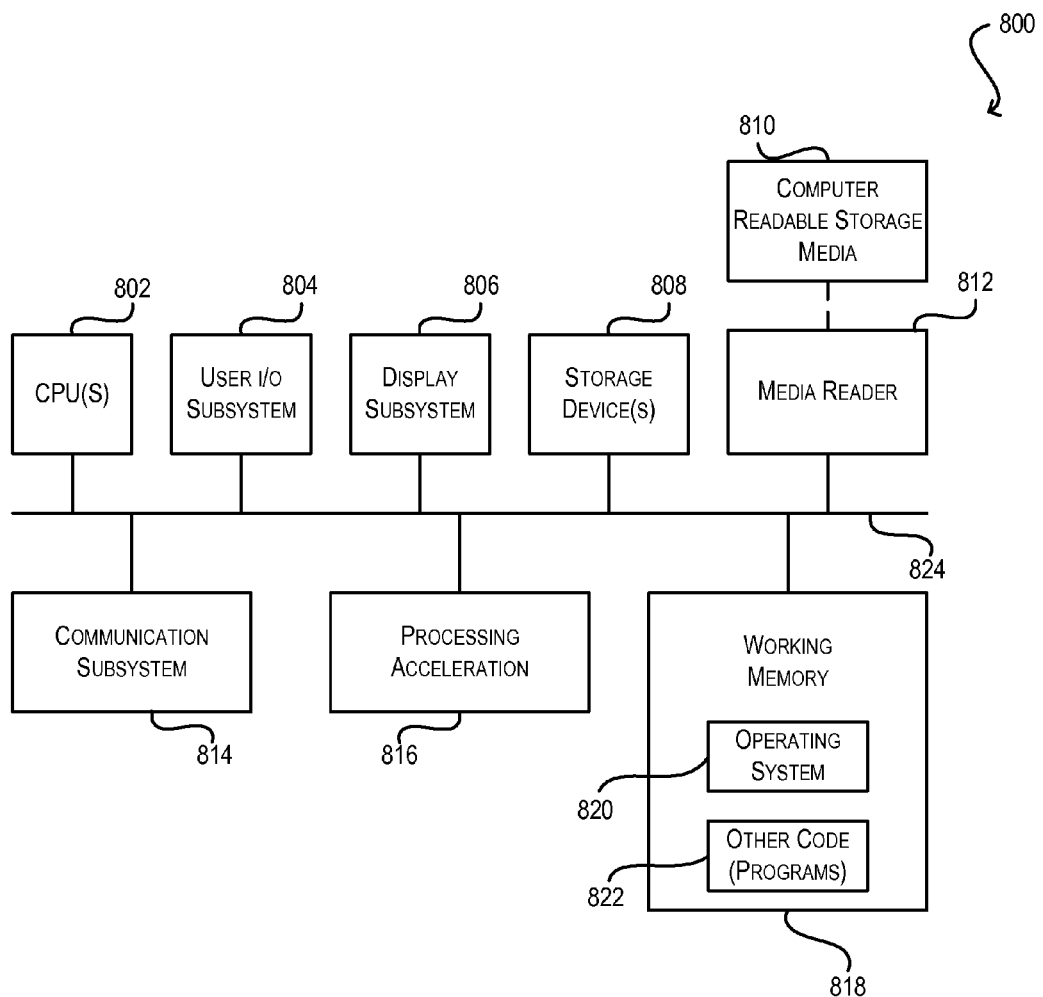
FIG. 8 is a simplified block diagram illustrating a computer system that may be used in accordance with an embodiment of the present invention.

FIG. 8 is a simplified block diagram illustrating physical components of a computer system 800 that may be used in accordance with an embodiment of the present invention. This diagram is merely an example, which should not unduly limit the scope of the claims. One of ordinary skill in the art would recognize many variations, alternatives, and modifications.

In various embodiments, computer system 800 may be used to implement any of the client computing devices 702, 704, 706, 708, or server computer 710 illustrated in system environment 700 described above. As shown in FIG. 8, computer system 800 comprises hardware elements that may be electrically coupled via bus 824. The hardware elements may include one or more central processing units ("CPUs") 802, one or more input devices 804 (e.g., a mouse, a keyboard, etc.), and one or more output devices 806 (e.g., a display device, a printer, etc.). For example, the input device 804 is used to receive user input for interacting with the GUIs illustrated in FIGS. 2-5. Computer system 800 may also include one or more storage devices 808. By way of example, storage devices 808 may include devices such as disk drives, optical storage devices, and solid-state storage devices such as a random access memory ("RAM") and/or a read-only memory ("ROM"), which can be programmable, flash-updateable and/or the like. In an embodiment, various databases are stored in storage device 808. For example, central processing unit 802 is configured to retrieve data from a database processing the data for displaying on a GUI.

Computer system 800 may additionally include a computer-readable storage media reader 812, a communication subsystem 814 (e.g., a modem, a network card (wireless or wired), an infrared communication device, etc.), and working memory 818, which may include RAM and ROM devices as described above. In some embodiments, computer system 800 may also include a processing acceleration unit 816, which can include a digital signal processor ("DSP"), a special-purpose processor, and/or the like.

Computer-readable storage media reader 812 can further be connected to a computer-readable storage medium 810, together (and, optionally, in combination with storage devices 808) comprehensively representing remote, local, fixed, and/or removable storage devices plus storage media for temporarily and/or more permanently containing computer-readable information. Communication subsystem 814 may permit data to be exchanged with network 712 of FIG. 7 and/or any other computer described above with respect to system environment 700.

Computer system 800 may also comprise software elements, shown as being currently located within working memory 818, including an operating system 820 and/or other code 822, such as an application program (which may be a client application, Web browser, mid-tier application, RDBMS, etc.). In a particular embodiment, working memory 818 may include executable codes and associated data structures for one or more of the design-time or runtime components/services illustrated in FIGS. 2 and 4. It should be appreciated that alternative embodiments of computer system 800 may have numerous variations from that described above. For example, customized hardware might also be used and/or particular elements might be implemented in hardware, software (including portable software, such as applets), or both. Further, connection to other computing devices such as network input/output devices may be employed. In various embodiments, the behavior of the zoom functions described throughout the present application is implemented as software elements of the computer system 800.

In one set of embodiments, the techniques described herein may be implemented as program code executable by a computer system (such as a computer system 800) and may be stored on machine-readable media. Machine-readable media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk ("DVD") or other optical storage, magnetic cassettes, magnetic tape, magnetic disk storage or other magnetic storage devices, or any other medium which can be used to store or transmit the desired information and which can be accessed by a computer.

Figure 9:
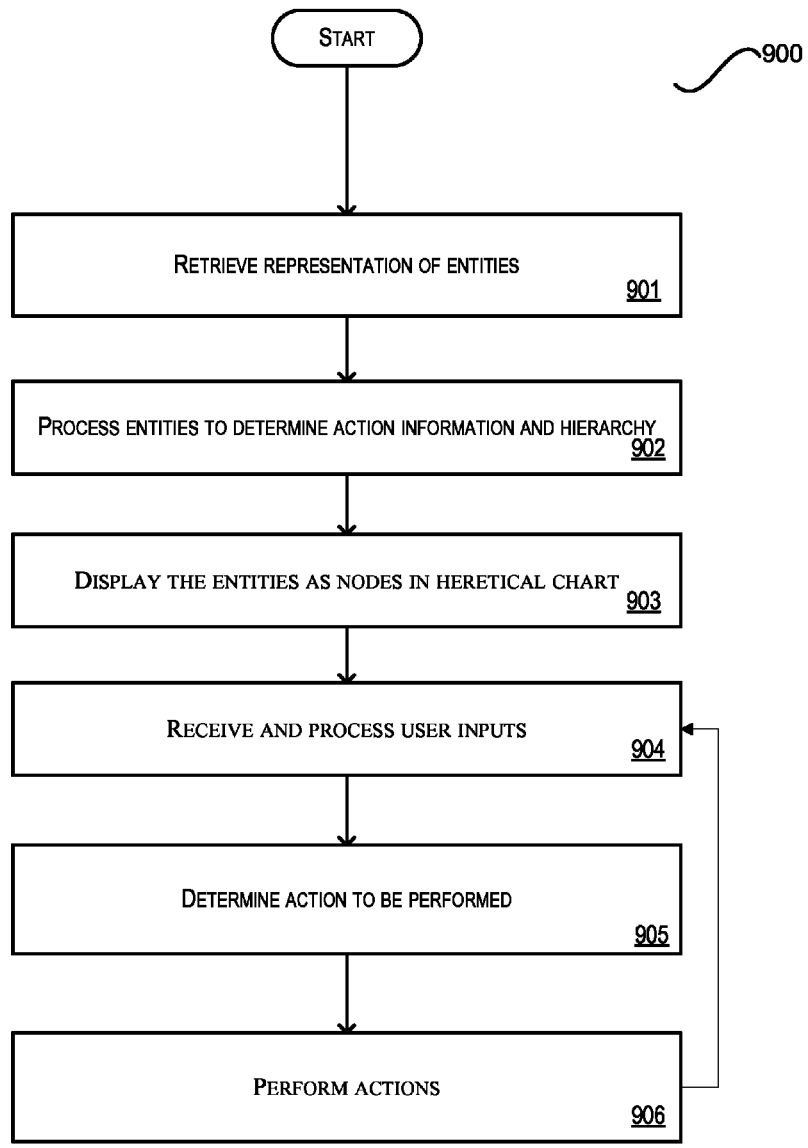
FIG. 9 is a simplified flow diagram illustrating operation of a graphical user interface according to an embodiment of the present invention.

In an embodiment, the systems illustrated in FIGS. 7 and 8 are configured to perform the following process as shown in FIG. 9:

1. obtaining information for a plurality of entities and their relationship data, at step 901, each of the plurality of entities including unique action types, the plurality of records including a first record and a second record, the first record including a first plurality of predefined actions, the second record including a second plurality of predefined actions;
2. processing the entities to determine a hierarchical relationship among the entities and actions for each of the nodes, at step 902;
3. displaying the plurality of entities within as an hierarchical chart based on at least the relationship data, at step 903;
4. receiving, by the user interface selection device, a user selection of one or more nodes, at step 904;
5. determining action to be performed, at step 905; and
7. performing action, at step 906.

In this process, the first set of menu actions consists of the first plurality of predefined actions if the user selection indicates that the first record is selected. The first set of menu actions consists of the second plurality of predefined actions if the user selection indicates that the second record is selected. The first set of menu actions consists of the predefined actions that are common to both the first record and the second record if the user selection indicates that both the first record and the second record are selected.

FIG. 9 is a simplified flow diagram illustrating operation of a graphical user interface according to an embodiment of the present invention. This diagram is merely an example, which should not unduly limit the scope of the claims. One of ordinary skill in the art would recognize many variations, alternatives, and modifications. For example, various steps as shown in FIG. 9 may be added, removed, replaced, modified, modified, repeated, and/or overlapped.

Although specific embodiments of the present invention have been described, various modifications, alterations, alternative constructions, and equivalents are within the scope of the invention. Further, while embodiments of the present invention have been described using a particular combination of hardware and software, it should be recognized that other combinations of hardware and software are also within the scope of the present invention. The present invention may be implemented only in hardware, or only in software, or using combinations thereof The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. In a computer system having a processor, a graphical user interface including a display and a user interface selection device communicatively coupled to the processor, a computer-readable storage medium containing codes for operating the graphical user interface, the code being executable by a processor, the computer-readable storage medium comprising:
    code for obtaining a plurality of information representing a plurality of entities and relationship data associated with the plurality of entities, each of the plurality of entities including unique action types, the plurality of entities including a first entity and a second entity, the first entity including a first plurality of predefined actions, the second entity including a second plurality of predefined actions;
    code for defining a menu region and a display region within the graphical user interface, the menu region including a first menu and a second menu;
    code for displaying the plurality of entities within the display region, the plurality of entities being displayed as nodes of a hierarchical chart based on at least the relationship data;
    code for receiving, by the user interface selection device, a user selection of one or more nodes displayed within the display region;
    code for processing the user selection;
    code for determining a first set of menu actions based on the user selection;
    code for determining a second set of menu action based on nodes related to the user selected one or more nodes;
    code for updating the first menu to includes the first set of the menu actions;
    wherein:
        the first set of menu actions consists of the first plurality of predefined actions if the user selection indicates that a node corresponding to the first entity is selected;
        the first set of menu actions consists of the second plurality of predefined actions if the user selection indicates that a node corresponding to the second entity is selected;
        the first set of menu actions consists of the predefined actions that are common to both the first entity and the second entity if the user selection indicates that nodes corresponding to both the first entity and the second entity are selected; and
    code for updating the second menu to include the second set of the menu actions;
    wherein:
        the second set of menu actions consists of actions related to the selected one or more nodes, wherein the related actions are configured to provide a selection menu of actions that are uniquely associated with the selected one or more nodes, wherein the graphical user interface includes a plurality of regions for performing the actions related to the selected one or more nodes and display information based on the actions, wherein the plurality of regions include various control functions depending on specific applications involved with the region, and
        the graphical user interface includes context sensitive menus which are not limited to the actions related to the selected one or more nodes, wherein the context sensitive menus are based on attributes of the nodes selected.

2. The computer-readable storage medium of claim 1 wherein the first set of menu actions is associated with a user privilege.

3. The computer-readable storage medium of claim 1 wherein the first menu is a global menu.

4. The computer-readable storage medium of claim 1 further comprising code for comparing the first plurality of predefined actions against the second plurality of predefined actions to determine the predefined actions that are common to both the first entity and the second entity.

5. The computer-readable storage medium of claim 1 further comprising code retrieving the first predefined actions from the database if the user selection indicates that the second entity is selected.

6. The computer-readable storage medium of claim 1 further comprising code for changing the first menu to include a second set of menu actions.

7. The computer-readable storage medium of claim 1 further comprising:
    code for receiving a user input for selecting a menu action from the first set of menu action;
    code for performing the menu action.

8. The computer-readable storage medium of claim 7 wherein the performing the menu action comprises displaying information associated with the menu action.

9. The computer-readable storage medium of claim 7 wherein the performing the menu action comprises sending a control signal from the computer system to a device communicatively coupled to the computer system.

10. The computer-readable storage medium of claim 1 further comprising code for providing a second menu within the menu region, the second menu including items for comparing information that are common to both the first entity and the second entity if the user selection indicates that nodes for both the first entity and the second entity are selected.

11. The computer-readable storage medium of claim 1 further comprising code for providing a default set of menu actions consisting of predefined actions that are common to all of the entities displayed within the display region.

12. The computer-readable storage medium of claim 1 wherein the database is obtained from a network.

13. The computer-readable storage medium of claim 1 wherein the database is obtained from a local hard disk.

14. The computer-readable storage medium of claim 1 wherein the user interface selection devices comprises a mouse, a keyboard, or a touch screen.

15. The computer-readable storage medium of claim 1 wherein the database comprises a hierarchical database.

16. The computer-readable storage medium of claim 1 wherein the first selectable menu comprises a dropdown list, the dropdown list including actions associated with the first set of menu actions.

17. In a computer system having a processor, a graphical user interface including a display and a user interface selection device communicatively coupled to the processor, the graphical user interface comprising:

a display region within the graphical user interface, the display region being adapted to display a plurality of nodes in a hierarchical chart, the plurality of nodes corresponding to information representing a plurality of entities stored in a database, relationship data associated with the plurality of entities being stored in the database, each of the plurality of entities including unique action types, the plurality of entities including a first entity and a second entity, the first entity including a first plurality of predefined actions, the second entity including a second plurality of predefined actions;

a menu region display within the display, the menu region including a first menu, the first menu including a first plurality of actions items, the plurality of actions items being common to each of the plurality of entities;

wherein, upon receiving a user selection of one or more nodes using the user interface selection device:

the processor processes the user selection;

the first menu is updated to include a second plurality of action items, the second plurality of action items includes the first plurality of actions if the user selection indicates that a node for the first entity is selected and the second set of menu actions are based on nodes related to the user selected one or more nodes;

the first menu is updated to include a second plurality of action items, the second plurality of action items includes the second plurality of predefined actions if the user selection indicates that a node for the second entity is selected;

the first menu is updated to include a second plurality of action items, the second plurality of action items includes the predefined actions that are common to both the first entity and the second entity if the user selection indicates that nodes for both the first entity and the second entity are selected; and the second set of menu actions consists of actions related to the selected one or more nodes, wherein the related actions are configured to provide a selection menu of actions that are uniquely associated with the selected one or more nodes, wherein the graphical user interface includes a plurality of regions for performing the actions related to the selected one or more nodes and display information based on the actions, wherein the plurality of regions include various control functions depending on specific applications involved with the region, and the graphical user interface includes context sensitive menus which are not limited to the actions related to the selected one or more nodes, wherein the context sensitive menus are based on attributes of the nodes selected.

18. The graphical user interface of claim 17 wherein the menu region further comprising a second menu, the second menu including menu items for comparing actions common to the selected nodes.

19. The graphical user interface of claim 17 wherein each of the nodes displayed in the display region includes an action menu.

20. The graphical user interface selection device of claim 19 the first plurality of predefined actions are displayed when the action menu of a node for the first entity is selected.

21. The graphical user interface of claim 17 wherein the user interface selection device includes a mouse, a keyboard, or a touch screen.

22. A computer system for providing an interactive graphical user interface, the system comprising:

a graphical user interface including a display, the display including a menu region and a display region within the graphical user interface, the menu region including a first menu, the display region being adapted to display a plurality of entities as a hierarchical chart based on at least relationship data from a database obtained, the relationship data associated with the plurality of records being stored in the database, each of the plurality of records including unique action types, the plurality of records including a first record and a second record, the first record including a first plurality of predefined actions, the second record including a second plurality of predefined actions;

a memory;

an input module for receiving user inputs, the input module being configured to receive a user selection of one or more records displayed within the display region;

a processor, the processor being configured to obtain records from the database and process the user input to determine a first set of menu actions based on the user selection and to process user input to determine a second set of menu action based on nodes related to the user selected one or more nodes;

wherein:

the first set of menu actions consists of the first plurality of predefined actions if the user selection indicates that the first record is selected;

the first set of menu actions consists of the second plurality of predefined actions if the user selection indicates that the second record is selected;

the first set of menu actions consists of the predefined actions that are common to both the first record and the second record if the user selection indicates that both the first record and the second record are selected;

the graphical user interface updates the first menu to include the first set of the menu actions; and the second set of menu actions consists of actions related to the selected one or more nodes, wherein the related actions are configured to provide a selection menu of actions that are uniquely associated with the selected one or more nodes, wherein the graphical user interface includes a plurality of regions for performing the actions related to the selected one or more nodes and display information based on the actions, wherein the plurality of regions include various control functions depending on specific applications involved with the region, and the graphical user interface includes context sensitive menus which are not limited to the actions related to the selected one or more nodes, wherein the context sensitive menus are based on attributes of the nodes selected.

23. The system of claim 22 wherein the processor determines the first of the predefined actions by processing information associated with the first record.

24. The system of claim 22 wherein the graphical user interface comprises a touch screen.

25. The system of claim 22 further comprising a network interface, the plurality of records being obtained from a network source through the network interface.

26. The system of claim 22 further comprising a storage for storing the database.

* * * * *

UNITED STATES PATENT AND TRADEMARK OFFICE
CERTIFICATE OF CORRECTION

PATENT NO. : 8,806,377 B2  
APPLICATION NO. : 12/563075  
DATED : August 12, 2014  
INVENTOR(S) : Chen et al.

Page 1 of 1

It is certified that error appears in the above-identified patent and that said Letters Patent is hereby corrected as shown below:

On title page, column 2, under Primary Examiner, line 1, delete "Tadeese" and insert -- Tadesse --, therefor.

On page 3, column 1, References Cited under Other Publications, line 18, delete "Qiuxa" and insert -- Quixa --, therefor.

In the Specification

In column 3, lines 12-13, delete "actions items," and insert -- action items, --, therefor.

In column 13, line 13, delete "of actions" and insert -- of action --, therefor.

In column 13, line 4, delete "thereof" and insert -- thereof. --, therefor.

In the Claims

In column 13, line 44, in Claim 1, delete "includes" and insert -- include --, therefor.

In column 15, line 14, in Claim 17, delete "actions items," and insert -- action items, --, therefor.

In column 15, line 14, in Claim 17, delete "of actions" and insert -- of action --, therefor.

Signed and Sealed this  
Seventeenth Day of March, 2015

Michelle K. Lee  
*Director of the United States Patent and Trademark Office*